Patented Jan. 9, 1934

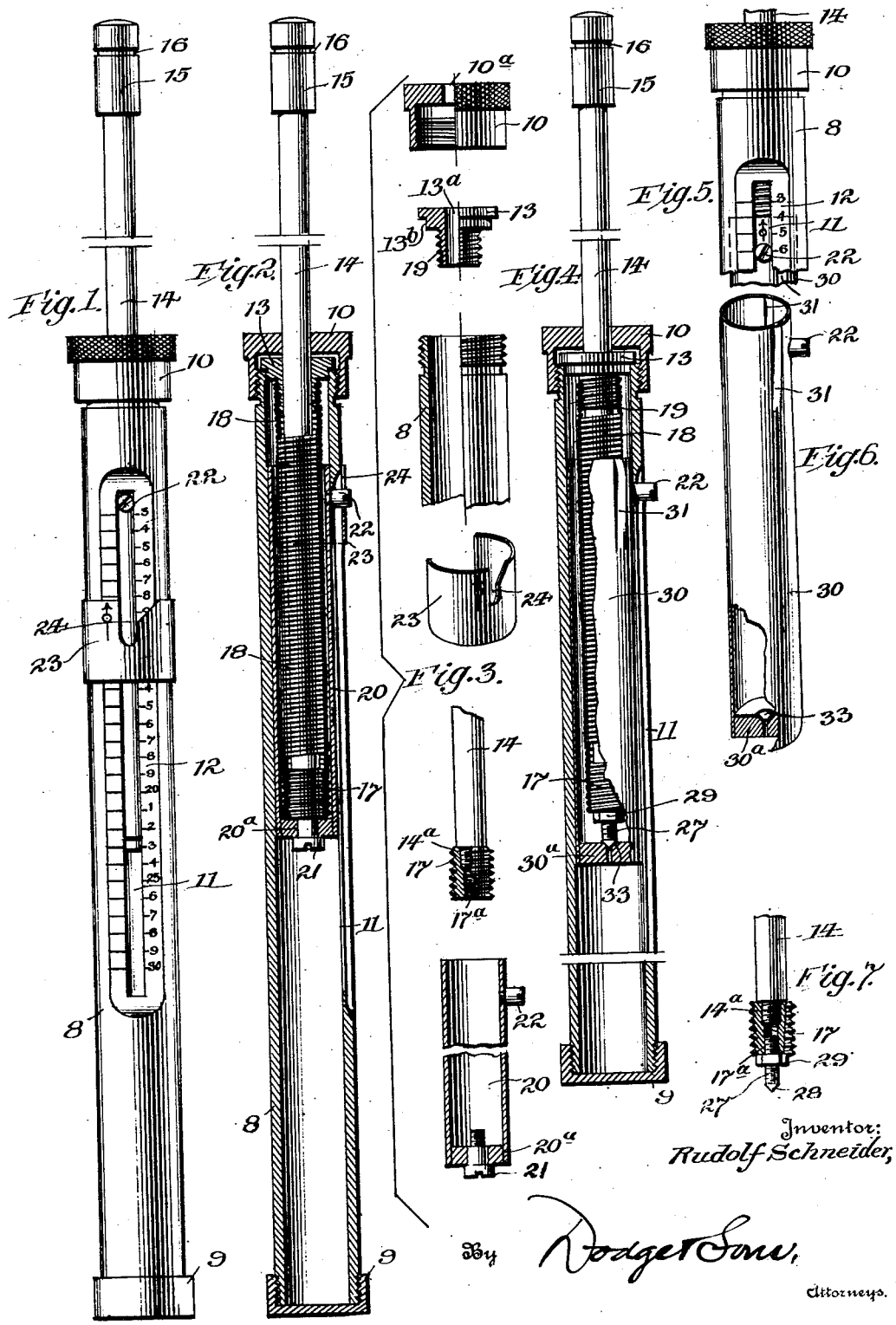

1,942,982

UNITED STATES PATENT OFFICE 1,942,982

TESTING DEVICE

Rudolf Schneider, Washington, D. C.

Application November 11, 1929
Serial No. 406,463

5 Claims. (Cl. 265—18)

My invention relates to testing devices and particularly to devices for determining the condition of fruit and vegetables both before and after shipment, especially where shipments are made over long distances and losses occasioned by delays in transit are frequent.

When products of this character are to be shipped over such distances that they must be harvested when in an unripe condition, the exact condition of the product at the time of shipment should be definitely ascertainable. This condition cannot be determined accurately by an inspection of the exterior surface of the product or by pressing the surface with the hands. If the product is to be in satisfactory condition at the end of its journey it is imperative that some reliable method of testing be available.

It has been found that the resistance of the products under consideration, to penetration by a hard body is an accurate measure of its condition. By establishing some standard by which this resistance can be accurately determined products can be shipped at the opportune time, and if they are delayed in transit and reach the consignee in a damaged or over ripe condition, the responsibility for the spoilage can be definitely placed upon the parties at fault.

One object of my invention is to produce a testing device which will accurately measure the condition of a body such as a piece of fruit or a vegetable.

Other objects are to provide a simple device which has few parts to become deranged; one which can be read easily and accurately and one which can be adjusted to compensate for variations in the instrument due either to wear or to ambient temperature.

Still other objects will appear from the following description when read in connection with the accompanying drawing.

In the drawing Fig. 1 is a front elevation of one form of testing device embodying my invention. Fig. 2 is a vertical sectional view of the device with the interior mechanism exposed. Fig. 3 is a disassembled view, partly in section, of the device shown in Figs. 1 and 2. Fig. 4 is a sectional view of another form of testing device embodying my invention, certain parts being broken away to show the interior construction. Fig. 5 is a fragmental detail view of a portion of the device shown in Fig. 4. Fig. 6 is a detail view of the indicator shown in Fig. 4 with parts broken away. Fig. 7 is a detail view, partly in section, of the plunger adjusting mechanism employed in connection with the form of the invention shown in Fig. 4.

Similar reference characters refer to similar parts in each of the several views.

Referring first to Fig. 1 the reference character 8 designates a cylindrical casing having its bottom end closed by a screw cap 9. The casing 8 contains a vertical elongated slot 11 which has associated with it a graduated scale 12.

Mounted within the casing 8 is a plunger 14 having an enlarged removable head 15 screwed to its outer end, and a threaded member 17 screwed to its inner end at 14$^a$. The head 15 contains a shallow groove 16 cut in its exterior surface adjacent the free end thereof.

The plunger 14 passes through an opening 13$^a$ in a cap 13 and has on one end a reduced threaded portion 19 for the reception of a spring 18, such spring having its other end wound about the threaded member 17. Cap 13 has a reduced portion 13$^b$ fitting accurately within the top end of casing 8 so as to center and guide the plunger 14 in its reciprocating movement. When the cap 13 is placed in position within the casing 8 the entire structure is retained within this casing by a threaded cap 10 having an opening 10$^a$ through which the plunger 14 moves freely.

Slidably mounted within the casing 8 is a tubular sleeve 20 held in place and guided within the casing by the cooperation of a screw 22 and the slot 11 in such casing. The closed end of tubular sleeve 20 contains an opening 20$^a$ to receive a screw 21 which is threaded into the portion 17$^a$ of member 17, and which secures the sleeve 20 tightly to the plunger 14.

It will now be clear that when the plunger 14 and the sleeve 20 are within the casing 8 and the cap 10 is secured in position, movement of the plunger will cause simultaneous movement of sleeve 20. Inasmuch as the spring 18 is wound about the threaded portion 19 of member 13 and also member 17, this movement will cause the spring to be elongated and will carry the sleeve 20 downwardly within the casing. The extent of this movement may be determined by reading the position of screw 22 with respect to scale 12 but this is an awkward procedure, hence I find it desirable to mount on the exterior of casing 8 a slidable index 23 adapted to clasp the casing and to be moved in one direction by the engagement of screw 22 and a slot 24 in the index 23. The slot 24 is open at the upper side so that when the plunger 14 is freed and returned to its normal position by the action of spring 18, the index 23 remains in the extreme position to which it has been advanced and therefore functions as a maximum indicator, and may be manually returned to its upper position when the reading has been taken.

This device is particularly applicable to the testing of perishable products such as fruits and vegetables. When the device is to be used to determine the condition of a consignment of fruit or vegetables before or after shipment, the index 23 is moved to the top of scale 12, in which position screw 22 is at the extreme upper end of slot 11 and in engagement with the bottom of slot 24 in the index. The body to be tested, an apple for example, may now be held in one hand and the head 15 brought into contact with a portion of the apple by the other hand which grasps the casing 8. Pressure is then brought to bear upon the apple and the device, until the head 15 penetrates the body of the apple as far as groove 16. The resistance of the apple to be tested causes plunger 14 to move inwardly of the casing thereby elongating spring 18, and moving sleeve 20 downwardly and carrying with it the index 23. When the pressure is removed and the head 15 withdrawn, plunger 14 returns to its initial position but index 23 remains in its advanced position until a scale reading has been taken. The index may now be manually returned to its top position ready for another test. It will of course be understood that the testing operation may be performed upon the products in situ as they lie in a box, barrel or other container.

One important advantage of this construction is that the scale reading need not be taken immediately, hence the attention of the operator can be concentrated upon the head 15, so as to insure that the penetration is not deeper than the groove 16. This arrangement materially reduces the possibility of errors which would most certainly occur if the scale had to be read simultaneously with the gauging of the head 15.

The embodiment of the invention shown in Figs. 4 to 7 is the same as that already described except that the index 23 is dispensed with and the tubular sleeve is modified to act as an index. The plunger 14, in this form, is also modified so that adjustments may be made to compensate for changes in the tension of spring 18.

Referring now to Fig. 4, the reference character 30 designates a sleeve which is adapted in and of itself to function as a maximum indicator. This sleeve is guided within the casing 8 by a screw 22 and a slot 11 as before, but is not permanently attached to the plunger 14, and is so constructed that it remains in the extreme position to which it is advanced by movement of the plunger.

Accordingly the closed end of sleeve 30 is formed by a disk-like member 30a containing a central opening terminating on the inside of the sleeve with a countersunk portion 33. The threaded member 17 contains an interiorly threaded opening 17a at its free end and into this is fitted a screw 27 having a conical outer head 28 adapted to fit into the countersunk portion 33 of disk 30a and arranged to be locked in adjusted position by a nut 29. By loosening this nut and rotating the screw 27 outwardly or inwardly, the initial position of the indicator 30 may be changed to compensate for variations in the spring 18, and after such adjustment the screw 27 can be held in the desired position by tightening nut 29. While the spring 18 can be accurately made and calibrated, it is subject to changes after long continued use and its length and tension will also vary as temperature conditions change, hence it is desirable that some means be provided whereby such changes may be counteracted.

As here shown, the upper end of sleeve 30 contains a plurality of resilient tongues 31 which are struck out from the sleeve body, and contact with the interior of casing 8, so as to hold the sleeve in any position to which it is advanced by inward movement of plunger 14. This sleeve functions as a maximum indicator in the same manner as the index 23, and the readings on scale 12 are made at the point where the top of sleeve 30 coincides with the scale divisions. After a reading is taken the sleeve is returned to initial position by pushing against the screw 22. This embodiment of my invention is much simpler than that shown in Fig. 1 because there are no external parts which can become misplaced or bent, and there is very little chance of the maximum indicator being moved inadvertently before the reading is taken.

This device is adapted for the testing of fruits and vegetables in order to determine their condition of ripeness or unripeness as shown by their resistance to the penetration of the spring opposed head 16. By testing edible products both before and after shipment their change in condition during transit can be accurately determined, and if shipments are delayed it can be definitely established that the products were in proper condition before being shipped. In this manner uncertainties in the condition of consignments can be eliminated and shipments made soon enough to insure arrival in satisfactory condition if there are no unusual delays.

It will be clear that the device of my invention is simple in construction, accurate in operation and little liable to derangement during use. The only part of the device which is subject to deterioration is the spring 18 and this can be readily replaced if it loses its elasticity or becomes too erratic for further use.

Although I have herein shown and described only two forms of my invention, it will be obvious that various changes and modifications may be made within the scope of the appended claims without departing from the spirit and scope of my invention.

What is claimed is:

1. A testing device for fruits and vegetables comprising a casing; a member supported by said casing and having an exposed end adapted to engage and penetrate to a predetermined degree the surface of a body to be tested; a tension spring secured to the casing and to the member for opposing movement of said member during such penetration; a tubular index surrounding said spring, said index being slidable within said casing and cooperating with a slot in said casing; adjustable means on the inner end of said member adapted to engage said index and advance it in the casing when said member engages the body to be tested; and means for holding said index in its maximum advanced position during retrograde movement of said member.

2. A testing device comprising a casing; a plunger supported in said casing and having a free end adapted to engage and penetrate to a predetermined degree the surface of a body to be tested; spring means supported in said casing and arranged to oppose inward movement of said plunger; a maximum indicator carried by said casing; contacting means on the inner end of said plunger for engaging said indicator during inward movement of said plunger; and means for adjusting the length of said contacting means to compensate for changes in the tension of the spring means.

3. A device for testing the hardness of fruits and vegetables comprising a tubular casing open at one end and having a slotted wall; a plunger removably mounted in said casing; a head carried by the outer end of said plunger and adapted to penetrate the surface of a body to be tested; means comprising an annular groove on said head in spaced relation to the free end of said head for gauging the amount of said penetration; a tension spring secured to said casing and to the inner end of said plunger for opposing inward movement of the plunger into said casing; a slidable sleeve within said casing, said sleeve surrounding the spring and being secured to the inner end of the plunger; a scale on said casing; an index slidably mounted on said casing in proximity to said scale; and means carried by said sleeve for actuating said index to give an indication of the amount of force applied to the device to secure penetration of the head up to the groove.

4. A device for testing fruits and vegetables comprising a cylindrical casing closed at one end and having a slot in its wall; a removable closure for the other end of said casing; a tension spring within said casing, said spring having one end secured to said closure; a supplemental perforated closure for said casing, said supplemental closure enclosing said removable closure; a plunger projecting through said closures and having its inner end secured to the free end of said spring; a head on said plunger for penetrating an object to be tested; means on said head for gauging the depth of penetration of said head into the object; a sleeve surrounding said spring within said casing and operatively associated with the inner end of said plunger; and guiding means carried by said sleeve and extending through said slot, the position of said guiding means indicating the amount of force applied to the device to secure penetration of the head up to the gauging means on said head.

5. A device for testing the hardness of fruits and vegetables and comprising a tubular casing open at one end; a slidable sleeve inside of said casing; a plunger movable longitudinally within said casing and having its inner end operatively associated with said sleeve; a head on the projecting end of said plunger for penetrating the surface of a body to be tested; an annular groove on said head in spaced relation to the free end of the head for gauging the depth of penetration of the head into the body; a tension spring between said sleeve and plunger, said spring being secured to the casing and to the plunger; a scale on the casing; and means movable with the sleeve and cooperating with said scale to indicate the extent of movement of said plunger when said head has penetrated the body up to the annular groove.

RUDOLF SCHNEIDER.